United States Patent [19]

Spencer et al.

[11] Patent Number: 4,995,894
[45] Date of Patent: Feb. 26, 1991

[54] ENCLOSURES FOR SLAG PELLETIZATION APPARATUS AND METHOD OF OPERATION

[75] Inventors: Kenneth W. Spencer, Ancaster; David T. Horvat, Hamilton; Peter A. MacKenzie, Stoney Creek, all of Canada

[73] Assignee: National Slag Limited, Hamilton, Canada

[21] Appl. No.: 345,270

[22] Filed: May 1, 1989

[51] Int. Cl.$^5$ .................. C03B 19/10; C03B 37/005
[52] U.S. Cl. .................................................. 65/19; 55/90; 55/94; 55/259; 55/260; 65/20; 65/141; 425/6
[58] Field of Search .............. 65/19, 20, 21.2, 141, 65/142; 425/6-8; 55/90, 94, 96, 242, 257.3, 257.5, 258-260; 264/8, 12

[56] References Cited

U.S. PATENT DOCUMENTS

| 475,575 | 5/1892 | Lawton et al. | 425/7 |
|---|---|---|---|
| 1,356,780 | 10/1920 | Nicol | 425/7 |
| 4,277,273 | 7/1981 | Legille et al. | 65/19 |
| 4,284,393 | 8/1981 | Brunosson et al. | 425/7 |
| 4,461,636 | 7/1984 | Gagneraud et al. | 65/141 |

Primary Examiner—Joye L. Woodard
Attorney, Agent, or Firm—Rogers & Scott

[57] ABSTRACT

An enclosure for slag pelletizers, and a method of operating such an enclosure, that minimizes the escape into the ambient atmosphere of airborne fibres produced by the pelletization process, while permitting the necessary free passage of the steam and gases that are also produced. The enclosure roof consists of at least one layer of wire mesh and a system of overlapping baffles is provided beneath the roof at least above the pelletizer to intercept the particulate material, so that the pellets do not disrupt a blanket of the fibre which is allowed to accumulate on the wire mesh to facilitate removal of the remainder of the fibre from the air stream. The method allows the deposition of an effective blanket, while preventing the deposition of too much fibre, so that the gas stream is diverted and flows out of the open end of the enclosure. A first plurality of water-mist producing nozzles is disposed between the mesh roof and the baffles, while a second plurality is disposed above the mesh roof both delivering a fine mist of water to wet fine particulate, causing it to deposit. A plurality of water-jet producing nozzles are disposed above the roof and delivers jets of water to wash the deposited particulate from the roof and baffle system down into the enclosure interior as and when required.

15 Claims, 3 Drawing Sheets

ENCLOSURES FOR SLAG PELLETIZATION APPARATUS AND METHOD OF OPERATION

FIELD OF THE INVENTION

This invention is concerned with improvements in or relating to enclosures for slag pelletization apparatus, and in particular to the provision of an improved enclosure for reducing the amount of airborne particulate matter which can escape into the ambient air during operation of the pelletization process. The invention also provides a new method of operating such an enclosure.

DESCRIPTION OF THE PRIOR ART

The pelletization of the slags that are produced in the manufacture of iron and steel is now a well-established industry. These slags are either air cooled in pits and crushed, granulated and ground, or pelletized, the pelletization producing a material that is better suited for utilization, for example, as a lightweight aggregate for road-building and the manufacture of concrete blocks. A process for such pelletization that has been commercially very successfull is described in our U.S. Pat. No. 3,594,142, issued 20th July 1971, the disclosure of which is incorporated herein by this reference. The process involves combining the molten slag with a carefully controlled proportion of water and throwing it through the air for a sufficient distance for it to separate and cool to produce self-sustaining spherical pellets before it reaches the ground. A radially finned drum rotating about a horizontal axis, called a rotary pelletizer, is used to throw the molten slag into the air, the slag usually being poured directly from a slag runner onto the top of the drum, the water being added to the slag through spray nozzles located above the drum, which is internally cooled to help protect it against the deleterious effects of the hot slag, whose temperature is usually above 1300° C. (2400° F.) for it to be in the molten state.

For safety reasons the pelletization process is usually conducted inside a large three-walled enclosure, the side furthest from the pelletizer being open to permit removal of the pellets. The top of the enclosure is covered with a coarse wire mesh screen to contain stray pellets and particulate material produced by the process, while permitting escape of the large quantities of steam and other gases that are also produced. The particulate material produced varies in size and texture from dust size particles to low overall density strands and/or fibres of the slag material, of size up to about 15 cm (6 ins) in length and up to 0.5 mm (0.02 in) diameter, much like the well-known "rock wool" that is deliberately produced for use as an insulation material. It is an unwelcome characteristic of much of this material that it can remain airborne for some time, and if it escapes from the enclosure it is distributed by air movements over the adjacent surroundings. Although this material is only produced at an average rate of about 150 g-300 g 300 g per tonne of slag processed, the daily slag production of an average furnace is about 600 tonnes, resulting in the production about 90 kg-180 kg of the particulate.

Although the weight of material is not high its bulk is considerable because of its low overall density. Government standards in Ontario, Canada now require that with such a process the particulate content of the ambient air be limited to 100 g/cubic metre, with a minimium particle size of 40 microns, and this is a difficult standard to achieve.

DEFINITION OF THE INVENTION

It is an object of the invention to provide a new enclosure for slag pelletization that will reduce the amount of airborne particulate which can escape therefrom.

It is another object to provide such an enclosure which can easily be cleaned of accumulated particulate matter, and which is capable of surviving the harsh environment associated with slag pelletization processes.

It is a further object to provide a new method of operating such an enclosure in association with a slag pelletization process.

In accordance with the present invention there is provided a slag pelletization enclosure for a pelletizer enabling the retention within the enclosure of airborne particulate material created during the operation of the pelletizer, the enclosure comprising:

an enclosure frame;

air impermeable wall members mounted by the frame constituting the wall of the enclosure and defining an enclosure interior;

an open mesh roof member mounted by the frame and through which gases produced as a result of operation of the pelletizer pass in exiting from the enclosure interior; and baffle means mounted on the enclosure frame beneath at least a portion of the area of the open mesh roof member above and adjacent the pelletizer, the baffle means permitting passage of gases therethrough while preventing passage of pellets and airborne particulate material which impinge thereon.

Preferably, the baffle means comprises two sets of transversely-spaced parallel individual baffles disposed with one set above the other and with the baffles of one set in vertical registry with the spaces between the baffles in the other set, the baffle means as viewed from the enclosure interior extending over the entire corresponding area of the open mesh roof member.

Also in accordance with the invention there is provided a method of operating a slag pelletization enclosure so as to retain within the enclosure pellets and airborne fibrous particulate material produced therein from slag material by a slag pelletization process, the enclosure comprising:

an enclosure frame;

air impermeable wall members mounted by the frame constituting the walls of the enclosure and defining an enclosure interior;

an open mesh roof member mounted by the frame and through which pelletization gases pass in exiting from the enclosure interior; and a rotary pelletizer mounted within the enclosure for projecting slag material that is impinged thereon upward through the air to form the pellets and the fibrous particulate material therefrom during its passage through the air;

the method including providing in the enclosure between the pelletizer and at least a part of the open mesh roof member above and adjacent to the pelletizer baffle means preventing impingement upon the roof member of upwardly projected pellets while permitting the passage therethrough of the exiting gases;

the method also including forming a filter blanket on the open mesh roof member by passage through the baffle means of a portion of the airborne fibrous particulate material with the exiting gases so as to deposit on the roof member while removing the remaining portion of the airborne fibrous particulate material from the exiting gases by impingement upon the baffle means and thereby preventing blockage of the open mesh roof member against passage of the exiting gases therethrough.

DESCRIPTION OF THE DRAWINGS

Particular preferred embodiments of the invention will now be described, by way of example, with reference to the accompanying diagrammatic drawings, wherein.

DESCRIPTION OF THE PREFERRED EMBODIMENT

Figure 1:
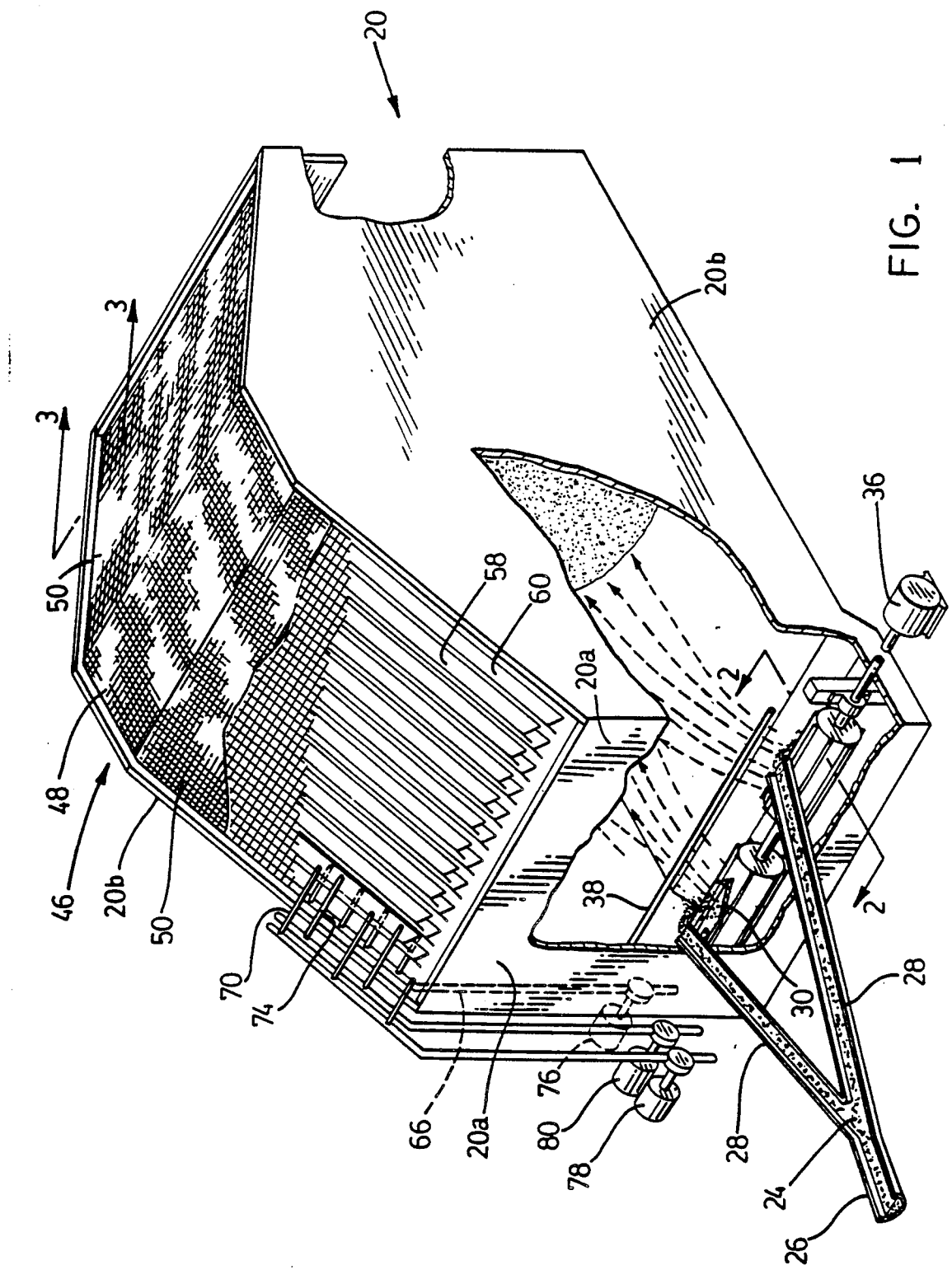
FIG. 1 is a perspective view of the pelletizer enclosure with parts of the walls cut away as necessary to show the interior thereof.

The pelletizer enclosure has the general reference 20 and encloses a pair of rotary horizontal drum type slag pelletizers 22 disposed side-by-side, the enclosure comprising an end wall 20a adjacent the pelletizers and two side walls 20b, the other end being open to permit removal of the pelletized material. Molten slag 24 from a blast furnace (not shown) flows along a slag runner 26 through the end wall 20a into its interior. In this embodiment the runner is bifurcated to provide two discharge portions 28, each of which discharges onto a respective vibratable deflector plate 30 and thence onto a respective pelletizer drum 32 supported at each end for rotation about a horizontal axis and driven in the direction of arrow 34 by a drive motor 36. The drum 32 is provided internally with water for cooling, while an external water spray system consisting of supply pipes 38 and nozzles 40 sprays water onto the slag to mix with it and produce the desired pyroplastic state for pelletization. Each pelletizer drum is provided with a number of circumferentially-spaced radially-extending longitudinal fins 42 which throw the slag into the air in the required direction and with the required trajectory. More details of typical processes and apparatus for pelletization are given in our prior U.S. Pat. Nos. 4,414,016 and 4,451,221, the disclosures of which are incorporated herein by this reference.

Figure 2:
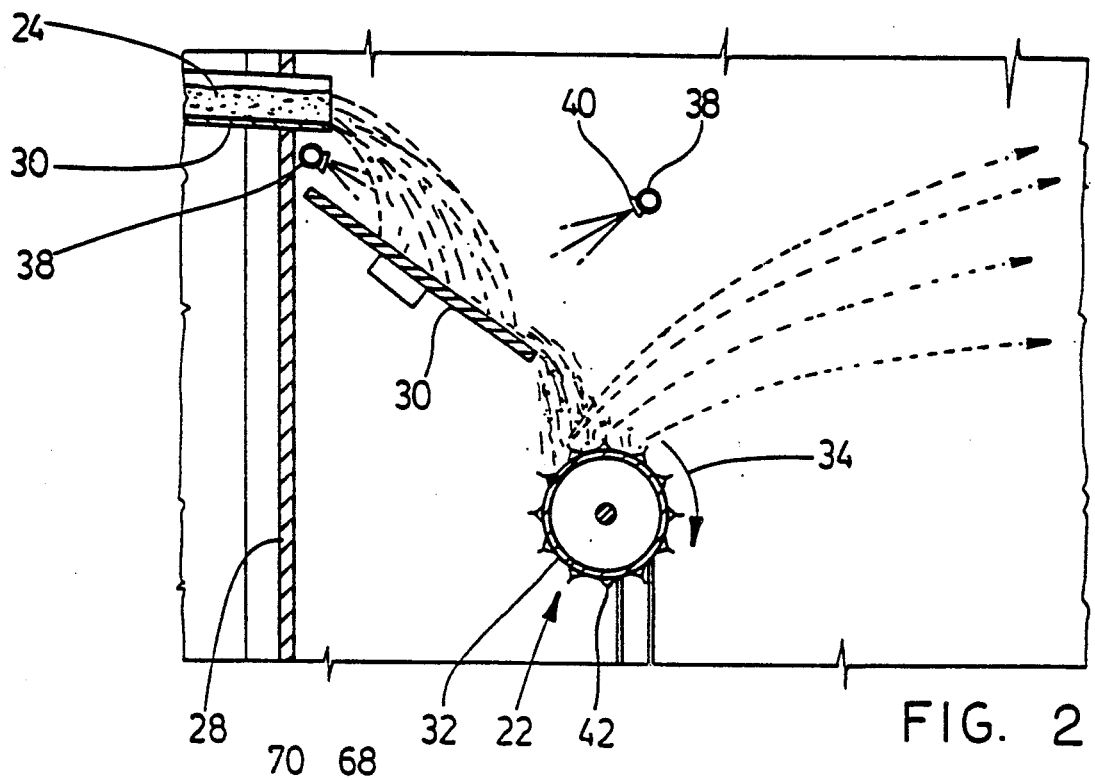
FIG. 2 is a cross-section through the enclosure taken on the line 2—2 of FIG. 1.

The thrown slag travels through the air a sufficient distance to land as a pile of cooled self-sustaining slag pellets some distance from the pelletizer, which subsequently are removed from the enclosure interior through the open end. Inevitably, some of the molten slag tends to fly in directions other than that desired and the enclosure 20 is therefore necessary to confine the pellets and protect the surrounding apparatus and adjacent personnel. A typical installation as illustrated has a width of approximately 10.7 meters (35 ft.), a length of approximately 18.3 meters (60 ft.) and a height of approximately 12.2 meters (40 ft.). The enclosure is topped by a wire mesh roof 46 having a horizontal centre section 48 and two end sections 50 of different lengths which slope from the centre section down towards the respective ends of the enclosure, the end section above the pelletizers being the shorter of the two. In this embodiment the wire mesh roof consists of an upper fine wire mesh 52 with 1.6 cm (0.625 in) openings to contain the pellets and to trap the coarse airborne particulate, and a lower stronger coarse wire mesh 54 with openings of approximately 10 cms (4 ins) which supports the fine wire mesh. Because of the extremely hostile environment caused by the molten slag and the hot acid gases that are produced the lower portions of the enclosure walls are made of iron plate of 2.5 cm (1 in) thickness, while the upper portions are of galvanised sheet iron of 6.3 cm (0.25 in) thickness mounted on a galvanized steel support framework 56 (FIG. 2), which also supports the wire mesh roof. The specific structure of the walls and their support framework does not constitute part of this invention, and for simplicity of illustration in FIG. 1 these details are not shown.

As described above, the production of the pelletized material is accompanied by substantial quantitites of particulate material of a nature and structure unique to these processes. Thus, in addition to the foamed or expanded pellets constituting the majority of the final material, solid pellets are produced of a wide range of sizes from dust upwards. Much of the low-density strand or fibre material is produced in the form of a "tail" to a respective bead of the molten material, which may stay with the parent bead, or may be broken away from it and travel separately. Use has been made of part of this fibrous particulate material to cooperate with the mesh roof in separating the remainder of the material from the gas stream. Thus, the first-produced fibres which deposit on the undersurface of the mesh roof quickly form a relatively fragile filter mat or blanket that is very effective in removing the subsequently-produced fibrous material from the air stream, while still permitting the gases to flow sufficiently easily therethrough. At the end of a "run" of the molten slag the reduction in gas flow and gas pressure against the fibre blanket results in the thicker and heavier portions falling down on to the pellet pile for removal, so that the blanket formation and removal has been somewhat self-regulating.

In practice such enclosures have not been as effective as anticipated in preventing escape of the fibrous material to the surroundings, and I believe that this is due principally to at least two problems that do not appear to have been recognized previously. The first is that the fibre blanket is continuously disrupted, at least in the area of the roof above the pelletizer, by the slag beads that are of sufficient size and that have been projected forcefully by the pelletizer upwards against it, instead of following the desired lower trajectory to the pellet pile. These disrupting particles break holes in the blanket through which fibres escape until the blanket is reformed. A second problem is that if too much fibre is produced during the run the blanket becomes too thick for sufficiently free passage of the gases and they turn down and escape through the open end of the enclosure, carrying the fibrous material with them to the exterior It is found that the amount of fibre produced per tonne of slag can vary considerably being dependent upon factors such as the slag chemistry and the ambient humidity The present invention provides a method and apparatus capable of mitigating or resolving both of these problems.

Figure 3:
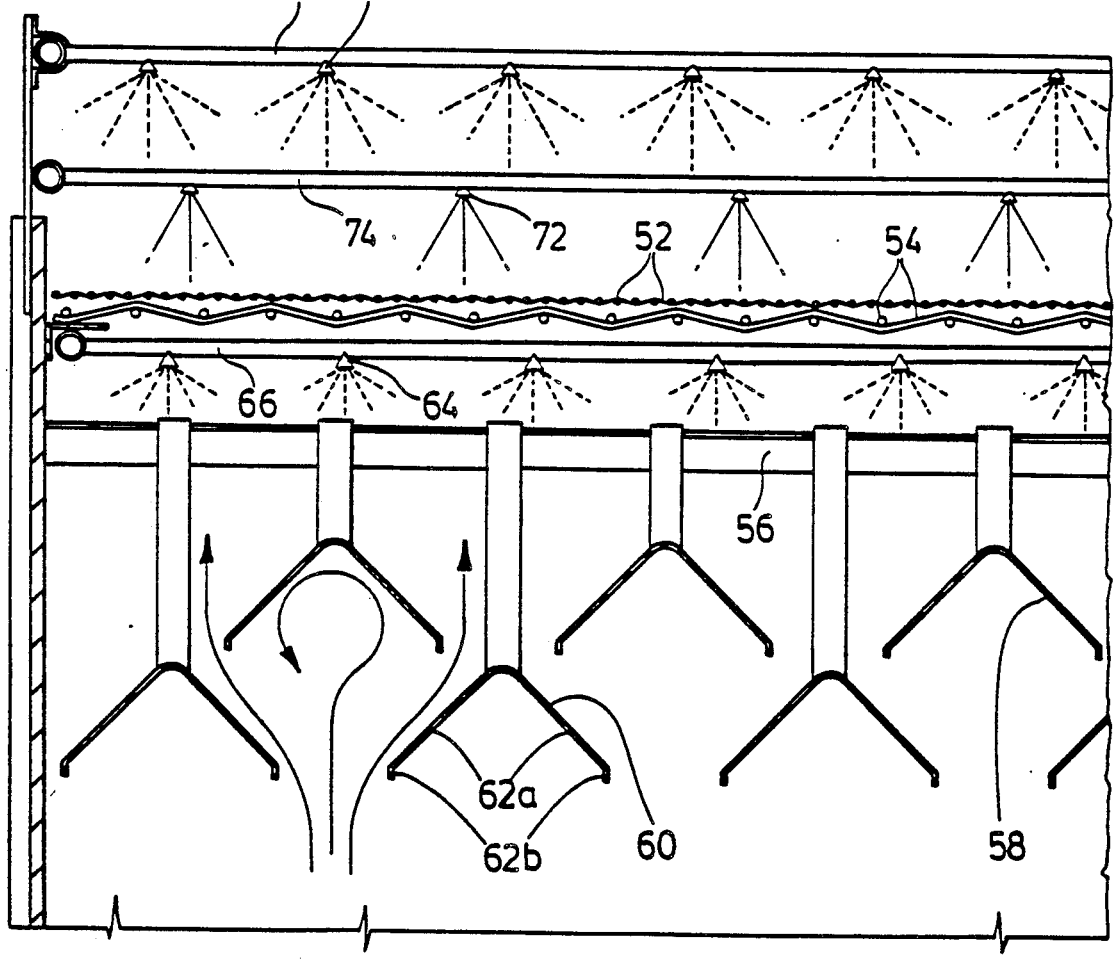
FIG. 3 is another cross-section view, taken on the line 3—3 of FIG. 1, showing only the upper portion of the enclosure, to show in more detail the structure of the baffle system.
Figure 4:
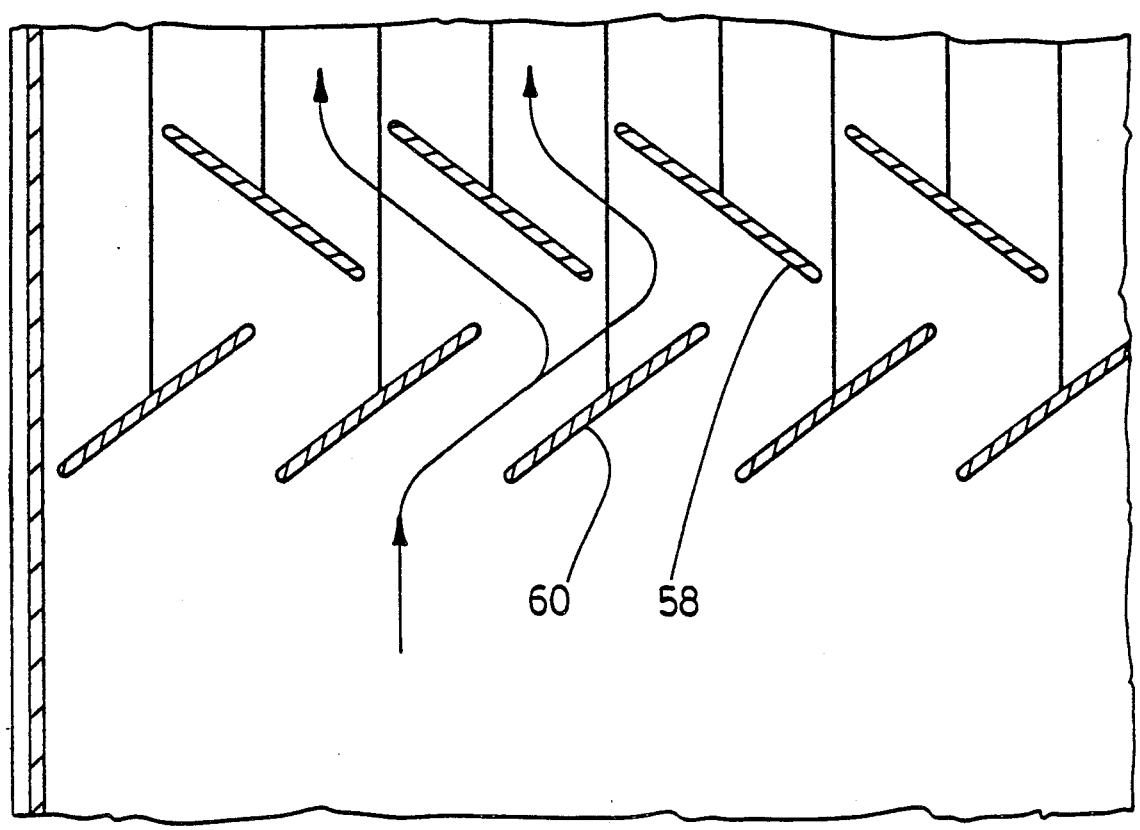
FIG. 4 is a cross-section view similar to FIG. 3 to illustrate another baffle structure.

In accordance with the invention there is provided suspended from the support framework 56, at least below the front portion 50 of the roof and above the pelletizers, a particulate-retaining baffle system consisting of an upper set of horizontal baffles 58, all disposed in the same horizontal upper plane, and a parallel transversely-spaced lower set of horizontal baffles 60, all disposed in the respective same horizontal lower plane. In this embodiment both sets extend the full length of the enclosure. As can best be seen in the end view of FIG. 3, each baffle 58 and 60 has the form of a right-angle channel disposed to form an inverted trough, i.e. with its mouth facing downward, comprising two legs with upper leg portions 62a which meet at an angle of 90° at a rounded peak, and lower leg portions 62b which project parallel to one another vertically downwards from the respective upper leg portions. The lower leg portions render the cross-section more rigid and permit use of thinner material. As again best seen in FIG. 3, the lower set of baffles 60 is disposed in vertical registry with the spaces between the immediately adjacent baffles 58 of the upper set. The individual baffles are wider than the respective spaces with which they register so that, as seen from below in the enclosure interior, the baffles appear to cover substantially the entire area of the roof. The upwardly-moving beads must therefore impinge against one of the baffles and cannot reach the fibre blanket to disrupt it. The vertical spacing between the two sets of baffles is such that the steam and other gases can pass relatively freely through the passages between them, but in their passage they are subjected to abrupt changes of direction and resultant turbulence, causing deposition on the baffles of much of the particulate material entrained therein. The gases encountering the wire mesh roof layers 52 and 54 are thus turbulent and, because of this turbulence, they are much more effective than hitherto in capturing the entrained particulate material. The air flow permitted by the baffles is made such that during a standard pour of the particular slag enough fibrous material deposits to form a satisfactory blanket, but not so much that the gases cannot pass through it and are forced unfiltered out of the open end. As before, at the end of the run the majority of the blanket will fall from the roof to be removed with the pelletized material. The air flow capacity of the baffle system is controlled by the shape of the baffles, their relative vertical and horizontal spacing, and also to some extent by their vertical distance from the mesh roof.

The larger fibrous particulate material is relatively easily trapped, but the finer dust-like material is more difficult to remove, since it tends to remain entrained in the gas flow despite its turbulence and changes of direction. The escape into the ambient air of any particulate material that has passed through the roof is therefore reduced, if not completely prevented, as required, by the provision of a first water-mist-producing system located between the wire mesh roof and the baffles and constituted by a plurality of mist-producing nozzles 64 supplied with water through pipes 66, these nozzles together generating a continuous fine mist of water over the entire area of the baffles. A second water-mist-producing system is provided located above the roof and constituted by a plurality of mist-producing nozzles 68 supplied with water through pipes 70, these nozzles together generating another fine mist of water over the entire roof exterior. These sprays moisten and thereby increase the weight of the particulate material in the emerging gases, causing it to drop back into the interior and onto the roof respectively, the increased weight also causing the particulate material which accumulates on the wire mesh roof to fall down into the enclosure interior. The amount of water added in this way is therefore kept to the minimum, since it is usually required that the pelletized material be as dry as possible.

The first mist-producing system is only used during the start of a slag run when the wire mesh roof is clean and does not have sufficient fibre particulate deposited on it to form an effective blanket. It helps to prevent escape of the finer particulate material during this initial period which lasts until the temperature and/or velocity of the exiting gases (sometimes referred to as the plume) becomes high enough to make the spray ineffective for this purpose.

If it is found that the fibre blanket has become too thick and has reduced the flow of gases by an unacceptable amount, and also if for any reason it is required to remove the deposited material from time to time, while avoiding the need for personnel to have to go onto the roof for this purpose, a water wash system is provided just above the roof and below the second water-mist-producing sytem, consisting of a number of spray-producing nozzles 72 supplied with water through pipes 74. When operated these nozzles provide concentrated sprays of water of sufficient force to physically remove attached particulate matter from the wire mesh and the baffle system. Preferably this is done while the enclosure is relatively empty of pellets so that they are not wetted by the more substantial quantity of water that is required, but will of course be done during the run if it is noted that gases are exiting through the open end instead of the roof. The water mist and water spray systems are supplied by respective pumps 76, 78 and 80 located at the base of the enclosure 20.

In this preferred embodiment the baffles of the two sets are of stainless steel in order to avoid rapid corrosion by the acid gases produced during the pelletization process. The horizontal centre roof section 48 is 3 meters (10 feet) long, while the two end sections are 9 and 6 meters (30 and 20 feet) long respectively. The channels are of corresponding length with their butting ends overlapping to avoid any gaps between them. The material of the channels is of 18 gauge (0.05 in) thickness with the inclined upper leg portions 62a of 21.6 cm (8.5 ins) length and the lower vertical leg portions 62b of 1.27 cm (0.5 in) length. The horizontal dimension of each channel between the lower leg portions is therefore 30.5 cm (12 ins), while the horizontal distance between immediately adjacent baffles is 20.3 cm (8 ins), so that there is a small horizontal overlap of about 5 cm (2 ins) at each edge between the channels of the upper and lower sets. The vertical depth of each channel is about 16.5 cm (6.5 ins) and the vertical distance between the peaks of the upper and lower sets is about 20.3 cms (8 ins), so as to leave longitudinal passages between them of adequate size for the passage of the gases therethrough.

The throughput of such an apparatus is usually of the order of about 600 tons of slag per day (10 slag discharges per day each of about 60 tons). The mist-producing nozzles 64 of the first system usually will only need to deliver the mist for a period of about 1–10 minutes, while the second system will need to be operative during the period of about 30–45 minutes that the slag is being delivered from the furnace. While operating each mist-producing system requires the delivery of about 45 to 450 liters (10 to 100 Imp gals.) of water per minute to provide the desired spray cover. As indicated above, the spray-producing nozzles 72 need only be operated as required, when it becomes apparent to the operator that there is excessive build-up of particulate material, and while operating will require the supply of about 200 to 700 liters (50 to 150 Imp gals.) per minute.

FIG. 4 shows another form that can be taken by the baffles 58 and 60, consisting of uni-planar strips of streamlined aerodynamic shape to give much less turbulence than the channel-shaped baffles of the first embodiment. They will therefore tend to remove less fibrous particulate from the gas stream but will still prevent impingement of the bead-like particulate against the blanket.

Although particular processes and apparatus have been described herein, it will be apparent to those skilled in the art that various changes and modifications can be made in specific details thereof, within the scope of the appended claims, particularly with respect to the cross-section of the baffles, the number of baffles in a row, the number of rows of baffles, and the spacing between individual baffles, which must suit the composition and structure of the particulate being captured.

Although in this embodiment a single composite mesh roof member is employed, consisting of supporting coarse mesh 54 and fine mesh 52, in other embodiments more than one such roof member may be employed vertically spaced from one another, so that the issuing gases must pass through them successively to reach the ambient atmosphere. The vertical spacing between the successive mesh roof members can vary substantially, between 15 cm (6 ins) and 180 cm (6 feet) for example. Preferably, the coarseness of the successive screens decreases in the direction of movement of the gases, so that they are increasingly effective in removing the entrained material.

We claim:

1. A slag pelletization enclosure in combination with a pelletizer for enabling retention within the enclosure of pellets and airborne particulate material created during the operation of the pelletizer, the enclosure comprising:

an enclosure frame;

air impermeable wall members mounted by the frame constituting the walls of the enclosure and defining an enclosure interior;

an open mesh roof member mounted by the frame and through which gases produced as a result of operation of the pelletizer pass in exiting from the enclosure interior; and baffle means mounted on the enclosure frame beneath at least a portion of the area of the open mesh roof member above and adjacent the pelletizer, the baffle means permitting passage of gases therethrough while preventing passage of pellets and airborne particulate material which impinge thereon.

2. An enclosure as claimed in claim 1, wherein the baffle means comprises two sets of transversely-spaced parallel individual baffles disposed with one set above the other and with the baffles of on set in vertical registry with the spaces between the baffles in the other set, the baffle means as viewed from the enclosure interior extending over the entire corresponding area of the open mesh roof member.

3. An enclosure as claimed in claim 2, wherein each individual baffle of the two sets of baffles has the form of an inverted trough.

4. An enclosure as claimed in any one of claims 1 to 3, further including a first plurality of water mist-producing nozzles mounted by the enclosure frame between the open mesh roof member and the baffle means to provide a water mist through which the exiting gases must pass fur further removal of airborne particulate material therefrom.

5. An enclosure as claimed in any one of claims 1 to 3, further including a plurality of water mist-producing nozzles mounted by the enclosure frame above the open mesh roof member to provide a water mist through which the exiting gases must pass for further removal of airborne particulate material therefrom.

6. An enclosure as claimed in any one of claims 1 to 3, further including a plurality of water jet-producing nozzles mounted by the enclosure frame above the open mesh roof member to provide water jets for washing retained particulate matter from the open mesh roof member and the baffle means into the enclosure interior.

7. An enclosure as claimed in any one of claims 1 to 3, further including first and a second plurality of water mist-producing nozzles mounted by the enclosure frame respectively between the open mesh roof member and the baffle means and above the open mesh roof member to provide respective water mists through which the exiting gases must pass for removal of airborne particulate material therefrom.

8. An enclosure as claimed in any one of claims 1 to 3, further including a plurality of water mist-producing nozzles and a plurality of water jet-producing nozzles, both mounted by the enclosure frame above the open mesh roof member, the plurality of mist-producing nozzles providing a water mist through which the exiting gases must pass for removal of airborne particulate material therefrom, and the plurality of jet-producing nozzles providing water jets for washing retained particulate matter from the open mesh roof member and the baffle means into the enclosure interior.

9. An enclosure as claimed in any one of claims 1 to 3, further including a first and a second plurality of water mist-producing nozzles mounted by the enclosure frame respectively between the open mesh roof member and the baffle means and above the open mesh roof member to provide respective water mists through which the exiting gases must pass for removal of airborne particulate material therefrom, and also including a plurality of water jet-producing nozzles mounted by the enclosure frame above the open mesh roof member, the jet-producing nozzles providing water jets for washing retained particulate matter from the open mesh roof member and the baffle means into the enclosure interior.

10. An enclosure as claimed in any one of claims 1 to 3, further including a plurality of vertically-spaced open mesh roof members mounted by the frame and through which the exiting gases pass successively in exiting from the enclosure interior.

11. A method of operating a slag pelletization enclosure so as to retain within the enclosure pellets and airborne fibrous particulate material produced therein from slag material by a slag pelletization process, the enclosure comprising:

an enclosure frame;

air impermeable wall members mounted by the frame constituting the walls of the enclosure and defining an enclosure interior;

an oven mesh roof member mounted by the frame and through which pelletization gases pass in exiting from the enclosure interior; and a rotary pelletizer mounted within the enclosure for projecting slag material that is impinged thereon upward through the air to form the pellets and the fibrous particulate material therefrom during its passage through the air;

the method including providing in the enclosure between the pelletizer and at least a part of the open mesh roof member above and adjacent to the pelletizer baffle means preventing impingement upon the roof member of upwardly projected pellets while permitting the passage therethrough of the exiting gases;

the method also including forming a filter blanket on the open mesh roof member by providing passage through the baffle means of a portion of the airborne fibrous particulate material with the exiting gases so as to deposit on the roof member while removing the remaining portion of the airborne fibrous particulate material from the exiting gases by impingement upon the baffle means and thereby preventing blockage of the open mesh roof member against passage of the exiting gases therethrough.

12. A method as claimed in claim 11, including providing above the open mesh roof member water jets for washing deposited particulate material from the open mesh roof member and the baffle means into the enclosure interior.

13. A method as claimed in claim 11, including providing above the open mesh roof member a water mist through which the exiting gases must pass for further removal of airborne particulate material therefrom.

14. A method as claimed in claim 13, including providing above the open mesh roof member water jets for washing deposited particulate material from the open mesh roof member and the baffle means into the enclosure interior.

15. A method as claimed in any one of claims 11 to 13, including providing between the baffle means and the open mesh roof member a water mist through which the exiting gases must pass for removal of airborne particulate material therefrom.

* * * * *